(12) United States Patent
Bordignon et al.

(10) Patent No.: US 9,145,944 B2
(45) Date of Patent: Sep. 29, 2015

(54) GAS SPRING EQUIPPED WITH IMPROVED SEALING MEANS

(76) Inventors: Alberto Bordignon, Rosà (IT); Simone Bordignon, Rossano Veneto (IT)

( * ) Notice: Subject to any disclaimer, the term of this patent is extended or adjusted under 35 U.S.C. 154(b) by 386 days.

(21) Appl. No.: 13/578,220

(22) PCT Filed: Feb. 10, 2010

(86) PCT No.: PCT/IT2010/000046
§ 371 (c)(1),
(2), (4) Date: Aug. 9, 2012

(87) PCT Pub. No.: WO2011/099040
PCT Pub. Date: Aug. 18, 2011

(65) Prior Publication Data
US 2012/0306132 A1    Dec. 6, 2012

(51) Int. Cl.
*F16F 9/02*    (2006.01)
*F16F 9/36*    (2006.01)
*F16J 15/32*    (2006.01)

(52) U.S. Cl.
CPC ............... *F16F 9/0218* (2013.01); *F16F 9/362* (2013.01); *F16J 15/3236* (2013.01); *F16J 15/3284* (2013.01)

(58) Field of Classification Search
CPC ...... F16F 9/0218; F16F 9/362; F16J 15/3236; F16J 15/3284
USPC .................................................. 267/124, 129
See application file for complete search history.

(56) References Cited

U.S. PATENT DOCUMENTS

| | | | | |
|---|---|---|---|---|
| 5,504,156 | A * | 4/1996 | Takezaki et al. ................ 525/93 |
| 6,460,839 | B2 * | 10/2002 | Muller .......................... 267/221 |
| 6,564,976 | B2 * | 5/2003 | Bettinger et al. ............. 222/340 |
| 6,591,948 | B2 * | 7/2003 | Casellas et al. .......... 188/322.18 |
| 7,278,632 | B2 * | 10/2007 | Cronholm et al. ............ 267/124 |
| 2003/0122318 | A1 * | 7/2003 | Yanagiguchi et al. ........ 277/534 |
| 2004/0112695 | A1 * | 6/2004 | Niwa et al. .............. 188/322.17 |
| 2004/0232641 | A1 * | 11/2004 | Kaiser ...................... 280/93.512 |
| 2004/0251634 | A1 * | 12/2004 | Shimazu et al. ............. 277/434 |
| 2005/0023113 | A1 * | 2/2005 | Karnes .......................... 198/851 |

(Continued)

FOREIGN PATENT DOCUMENTS

DE    4436028    4/1996
GB    2073077    10/1981

OTHER PUBLICATIONS

Written Opinion of the International Preliminary Examining Authority for PCT/IT/2010/000046, dated Jun. 15, 2012.

(Continued)

*Primary Examiner* — Robert A Siconolfi
*Assistant Examiner* — Charles Poon
(74) *Attorney, Agent, or Firm* — Nathan S. Smith; McDermott Will & Emery LLP

(57) ABSTRACT

A gas spring is provided that can comprise at least one rod, at least one guide bushing, and at least one dynamic seal. The rod can slide inside at least one cylinder containing gas. The dynamic seal can be interposed between the rod and the cylinder. In some embodiments, the guide bushing can be formed from a first mixture comprising a thermoplastic polymer and a solid lubricant filler. Further, in some embodiments, the dynamic seal can be formed from a second mixture comprising a thermoplastic elastomer and a mineral filler or a powder of thermoplastic polymer.

21 Claims, 2 Drawing Sheets

(56) References Cited

U.S. PATENT DOCUMENTS

| | | |
|---|---|---|
| 2005/0049346 A1* | 3/2005 | Blanchard et al. ............ 524/423 |
| 2007/0093602 A1* | 4/2007 | Thompson-Colon et al. ............................ 525/127 |
| 2010/0116422 A1* | 5/2010 | Vaideeswaran et al. ...... 156/217 |
| 2010/0117310 A1* | 5/2010 | Celik et al. .................... 277/650 |

OTHER PUBLICATIONS

International Search Report for PCT/IT2010/000046, dated Apr. 1, 2012.

* cited by examiner

GAS SPRING EQUIPPED WITH IMPROVED SEALING MEANS

This application is a national stage application, under 35 U.S.C. §371, of international Application No. PCT/IT2010/000046, filed on Feb. 10, 2010, and titled "Gas spring Equipped With Improved Sealing Means," the entirety of which is hereby incorporated by Reference herein.

BACKGROUND

1) Field of the in Inventions

The present invention relates to a gas spring, in particular for moulds, equipped with improved sealing means.

2) Background Art

As it is known, a gas spring is a device which, unlike conventional springs, uses a pressurized gas contained in a cylinder and compressed in a variable manner by a piston rod to exert a return force. Gas springs are used in numerous applications, in particular in the automotive, medical, furniture, aerospace and moulding sectors.

In this latter case, the gas springs for moulds are normally charged with nitrogen $N_2$ at pressures of over 100 bars and constituted by a cylinder adapted to contain said gas therein and inside which the rod can slide: to allow the gas to be stored and compressed inside the cylinder one or more seal elements or gaskets are normally interposed between said cylinder and the rod, and these seal elements generally comprise at least one guide bushing and at least one rod seal. Therefore, starting from an idle position of the gas spring, to take the rod to the end of its travel it is necessary to apply a force thereon, this force naturally being greater than the initial force of the gas spring: the return movement of the rod, when the action of the applied force ceases, is instead automatic and caused by the pressure exerted by the gas on the rod inside the cylinder.

In prior art gas springs the guide bushings are produced with nylon, Teflon or other polymers, while the rod seals are produced with TPU (thermoplastic polyurethane), PU (polyurethane) or other polymers.

Typically, prior art gas springs have a useful life, intended as number of cycles that the rod can perform, beyond which gas starts to leak causing progressive loss of performance of the springs until reaching complete exhaustion. Normally, gas leakage occurs when the rod seal no longer adequately seals the surface of the rod due to wear caused by sliding on the surface of the rod and by the extrusion present between the surface of the rod and the surface of the guide bushing or of the cylinder.

In order to improve the resistance to wear and extrusion, prior art suggests the use of different fillers to mix with TPU, nylon or Teflon to produce rod seals and guide bushings. These fillers are usually constituted by lubricants, usually composed of PTFE (polytetrafluoroethylene), graphite or silicones, and/or reinforcing agents, usually composed of organic and inorganic fibres.

Prior art also suggests filling TPU with barite ($BaSO_4$) for specific and limited applications such as those below:

in the medical field $BaSO_4$ fillers are used to allow a component produced with TPU (such as a catheter), which would otherwise be invisible, to be viewed using X-rays; given the high specific weight of $BaSO_4$, it is added to the TPU to increase its weight for commercial purposes;

$BaSO_4$ is used in the mechanical industry for grinding wheels as at low temperatures it promotes the formation of $Fe_3O_4$ on the surface of ground work pieces according to the reaction $BaSO_4+3Fe \rightarrow Fe_3O_4+BaS$, the $Fe_3O_4$ having a lubricating action.

SUMMARY

Object of the present invention is solving the aforesaid problems of prior art by providing a gas spring, in particular for moulds, equipped with improved seal elements, said elements comprising at least a guide bushing adapted to increase the useful life of the spring with respect to prior art gas springs.

Another object of the present invention is providing a gas spring, in particular for moulds, equipped with improved seal elements, said elements comprising at least one rod seal adapted to increase the useful life of the spring with respect to prior art gas springs.

Moreover, an object of the present invention is to provide a gas spring, in particular for moulds, equipped with improved seal elements, said elements comprising at least a guide bushing and/or a rod seal and being adapted to increase the useful life of the spring, in particular in the case of correct use, with rod travel perpendicular to the base of the cylinder, without lubrication and with double cycles per minute.

Another object of the present invention is to provide a gas spring, in particular for moulds, equipped with improved seal elements, said elements comprising at least a guide bushing and/or a rod seal and being adapted to increase the useful life of said spring, in particular in the case of incorrect use, with rod travel not perpendicular to the base, without lubrication and with standard cycles per minute.

The aforesaid and other objects and advantages of the invention, which will be apparent in the description below, are achieved with a gas spring, in particular for moulds, equipped with improved seal elements such as the one described in claim 1. Preferred embodiments and non-trivial variants of the present invention form the subject matter of the dependent claims.

It will be immediately apparent that numerous variants and modifications can be made to the description (i.e. relevant to shape, dimension, arrangement and parts with equivalent functions) without departing from the scope of protection of the invention as it appears in the appended claims.

BRIEF DESCRIPTION OF THE DRAWINGS

The present invention will be better described by some preferred embodiments, provided by way of non-limiting example, with reference to the accompanying drawings, wherein.

DETAILED DESCRIPTION OF PREFERRED EMBODIMENTS

Figure 1:
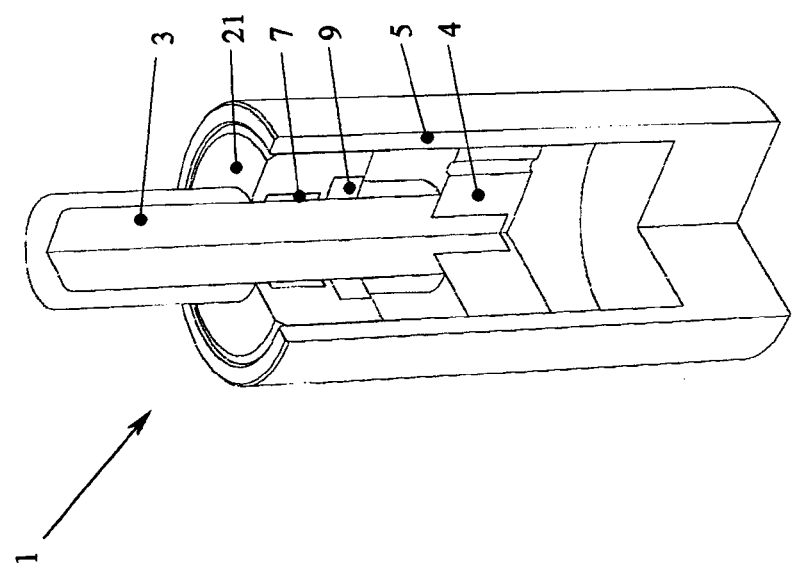
FIG. 1 shows a perspective and partially sectional view of a preferred embodiment of the gas spring according to the present invention.

With reference to the figures, it can be seen that the gas spring 1, in particular for moulds, according to the present invention is composed of at least a rod 3 with relative perforated flange 4 sliding inside at least a cylinder 5 containing said gas, improved seal elements being interposed between said rod 3 and said cylinder 5, said elements comprising at least a guide bushing 7 and/or at least a dynamic seal 9.

Moreover, the gas spring 1 optionally comprises other components whose arrangement is known in the art, such as a rod scraper element 11, an O-ring 13, an anti-extrusion ring 15 adapted to prevent extrusion of the O-ring 13 and at least a valve 17 with relative threaded cap 19.

Figure 2:
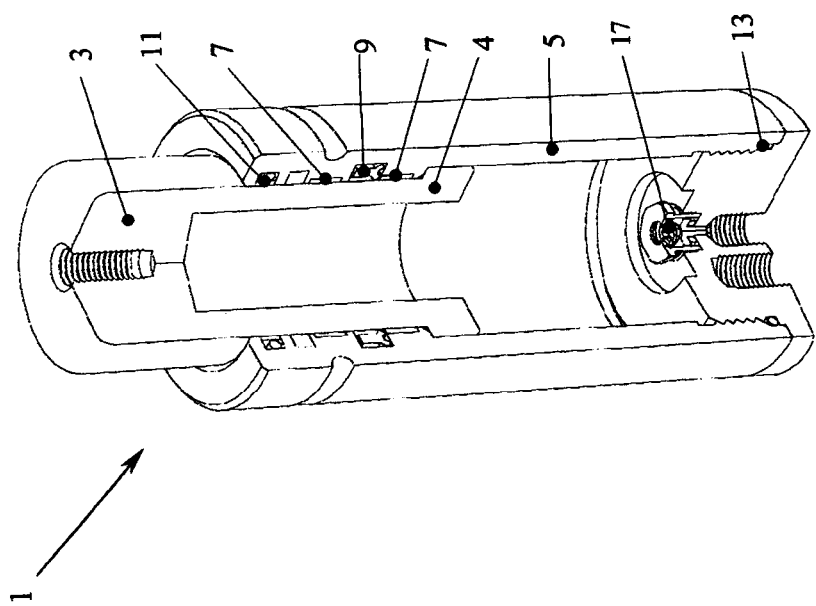
FIG. 2 shows a perspective and partially sectional view of another preferred embodiment of the gas spring according to the present invention.
Figure 4:
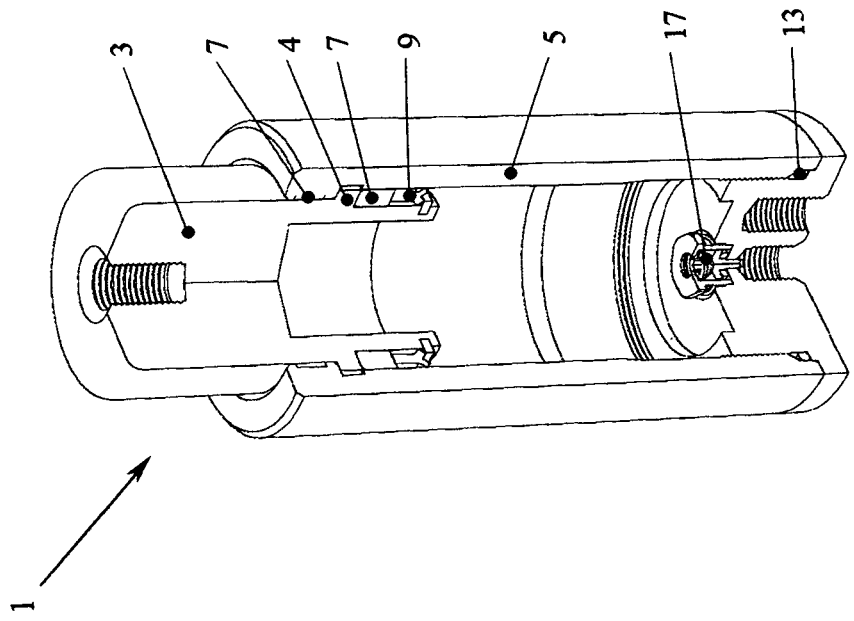
FIG. 4 shows a perspective and partially sectioned view of another preferred embodiment Of the gas spring according to the present invention.
Figure 3:
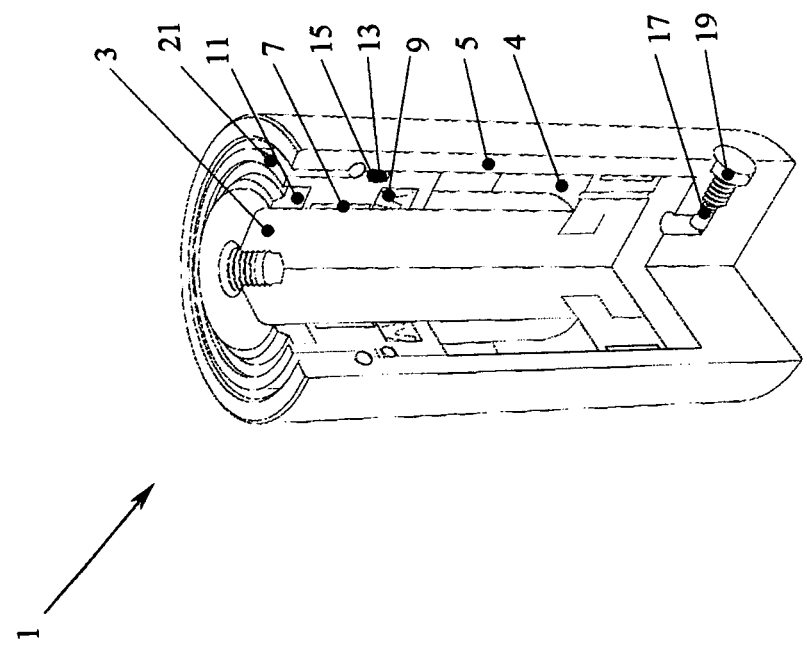
FIG. 3 shows a perspective and partially sectioned view of another preferred embodiment Of the gas spring 25 according to the present invention.

Optionally, the guide bushing 7 is interposed between a guide bushing 2 for sliding of the rod 3 and the rod 3 itself. Moreover, as shown in particular in FIG. 2, the dynamic seal 9 can be positioned on the flange 4 of the rod 3 so as to create a seal on the inner surface of the cylinder 5.

Advantageously, the guide bushing 7 is produced with a material constituted by a first mixture composed of a quantity in weight of an organic thermoplastic polymer preferably between 60% and 99%, more preferably between 90% and 98% and even more preferably equal to 95% and a supplementary quantity to 100% of a solid lubricant filler.

Preferably, the organic thermoplastic polymer of the first mixture is a PEEK (polyether ether ketone). Alternatively, the organic thermoplastic polymer of the first mixture can also be a PEKK (polyether ketone ketone), a PEK (polyether ketone), a PEI (polyether imide), a PPS (polyphenylene sulphide), a PES (polyether sulfone), a PEKEKK (polyether ketone ether ketone ketone), a PEEKK (polyether ether ketone ketone), a PEEKEK (polyether ether ketone ether ketone) or a PEEEK (polyether ether ether ketone), appropriately mixed.

Preferably, the solid lubricant filler of the first mixture is a dichalcogenide, even more preferably selected from $MoS_2$, $WS_2$, $WSe_2$, $MoSe_2$, $NbS_2$ or $NbSe_2$ in powder with grain dimension in the order of $\eta m$ and nanometres.

Advantageously, the dynamic seal 9 is instead produced with a material constituted by a second mixture composed of a quantity in weight of a thermoplastic elastomer preferably between 50% and 70%, more preferably equal to 60% and a quantity in weight of mineral filler preferably between 1% and 30%, more preferably between 2% and 20% or of an organic thermoplastic polymer preferably between 3% and 40%, more preferably between 5% and 20%.

Preferably, the mineral filler is a barite, more preferably barite $BaSO_4$ and the quantity in weight of said barite $BaSO_4$ is equal to 8% while, alternatively, the quantity in weight of the organic thermoplastic polymer is equal to 9%.

Preferably, the thermoplastic elastomer is a TPU (thermoplastic polyurethane) or a TPE (thermoplastic polyethylene) and the organic thermoplastic polymer of the second mixture is a PEEK, PEKK, PEKEKK, PEK, PEEKK, PEEKEK or PEEEK.

Optionally, the second mixture can also comprise a quantity in weight of a solid lubricant filler preferably between 0.2% and 30%, more preferably between 0.4% and 10% and even more preferably equal to 4%. Preferably, the solid lubricant filler of the second mixture is a dichalcogenide, more preferably selected from $MoS_2$, $WS_2$, $WSe_2$, $MoSe_2$, $NbS_2$ or $NbSe_2$ in powder with grain size in the order of $\eta m$ and nanometres.

Through experiments to test the useful life, to which the gas spring according to the present invention as described above was subjected, the Applicant has verified the extraordinary and unexpected properties of resistance to wear of the guide bushing 7 and of the dynamic seal 9 produced according to the compositions described above.

In particular, these tests showed that:
in the case of correct use, with rod 3 travel perpendicular to the base of the cylinder 5, without lubrication but with double cycles per minute, the useful life increased by over 15% with respect to the useful life with standard cycles per minute;
in the case of incorrect use, with rod 3 travel not perpendicular to the base (inclination of 1°) of the cylinder 5 but without lubrication and with standard cycles per minute, the useful life increased by 30% with respect to the case of correct use, i.e. with rod 3 travel perpendicular to the base of the cylinder 5, with standard cycles per minute, without lubrication.

The results of the aforesaid tests are set down in the comparative table below, from which it is possible to deduce the significant increases in the useful life of a gas spring 1 according to the present invention equipped with guide bushings 7 and/or rod seals 9 as previously described with respect to a gas spring belonging to the prior art:

| Gas spring: | useful life | velocity | inclination |
| --- | --- | --- | --- |
| Prior art | 100 | 100 | 0° |
| Equipped with guide bushing 7 | ~100 | 200 | 0° |
| Equipped with dynamic seal 9 | ~120 | 100 | 0° |
| Equipped with guide bushing 7 and dynamic seal 9 | ~115 | 200 | 0° |
| Equipped with guide bushing 7 and dynamic seal 9 | ~130 | 100 | 1° |

The aforesaid tests were conducted on a gas spring 1 equipped with a guide bushing 7 produced with a first mixture composed of 79% PEEK and 21% $WS_2$ and/or a dynamic seal 9 produced with a second mixture composed in weight of 61% TPU, 22% $BaSO_4$ and 17% $WS_2$.

Some preferred embodiments of the invention have been described, but these are naturally susceptible to further modifications and variants within the scope of the same inventive concept. In particular, numerous variants and modifications, functionally equivalent to those above and falling within the scope of protection of the invention as set forth in the appended claims, will be immediately apparent to those skilled in the art.

The invention claimed is:

1. A gas spring for moulds, comprising:
   at least one rod sliding inside at least one cylinder containing gas;
   at least one guide bushing; and
   at least one dynamic seal being interposed between the rod and the cylinder,
   wherein the guide bushing comprises a first mixture comprising a first thermoplastic polymer and a solid lubricant filler, and
   wherein the dynamic seal comprises a second mixture comprising (i) a second thermoplastic polymer having a quantity in weight of about 61%, (ii) a mineral filler having a quantity in weight of about 22%, and (iii) a powder of solid lubricant filler having a quantity in weight of about 17%.

2. The gas spring of claim 1, wherein the mineral filler of the second mixture comprises a barite.

3. The gas spring of claim 2, wherein the mineral filler of the second mixture comprises $BaSO_4$.

4. The gas spring of claim 1, wherein the second thermoplastic polymer of the second mixture comprises a TPU or a TPE.

5. The gas spring of claim 1, wherein the powder of solid lubricant filler of the second mixture comprises a PEEK, a PEKK, a PEKEKK, a PEK, a PEEKK, a PEEKEK, or a PEEEK.

6. The gas spring of claim 1, wherein the second thermoplastic polymer of the second mixture comprises a polyaryletherketone.

7. The gas spring of claim 1, wherein the second mixture comprises a solid lubricant filler comprising a dichalcogenide.

8. The gas spring of claim 1, wherein the solid lubricant filler comprises $MoS_2$ $WS_2$, $WSe_2$, $MoSe_2$ $NbS_2$, or $NbSe_2$ in powder.

9. The gas spring of claim 1, wherein the second thermoplastic polymer comprises TPU, the mineral filler comprises $BaSO_4$, and the powder of solid lubricant filler comprises $WS_2$.

10. The gas spring of claim 1, wherein the first thermoplastic polymer of the first mixture has a quantity in weight of between about 60% and 99%, and the solid lubricant filler has a quantity in weight of between about 1% and 40%.

11. The gas spring of claim 10, wherein the first thermoplastic polymer of the first mixture has a quantity in weight of about 79%, and the solid lubricant filler has a quantity in weight of about 21%.

12. The gas spring of claim 10, wherein the first thermoplastic polymer of the first mixture comprises PEEK, and the solid lubricant filler comprises $WS_2$.

13. A gas spring for moulds, comprising:
at least one rod sliding inside at least one cylinder containing gas;
at least one guide bushing; and
at least one dynamic seal being interposed between the rod and the cylinder,
wherein the guide bushing comprises a first mixture comprising a first thermoplastic polymer having a quantity in weight of about 79% and a solid lubricant filler having a quantity in weight of about 21%, and
wherein the dynamic seal comprises a second mixture comprising (i) a second thermoplastic polymer having a quantity in weight of between about 50% and 70%, (ii) a mineral filler having a quantity in weight of between about 1% and 30%, and (iii) a powder of solid lubricant filler having a quantity in weight of between about 3% and 40%.

14. The gas spring of claim 13, wherein the second thermoplastic polymer of the second mixture comprises a TPU or a TPE.

15. The gas spring of claim 13, wherein the second thermoplastic polymer of the second mixture comprises a polyaryletherketone.

16. The gas spring of claim 13, wherein the quantity in weight of the mineral filler is between about 2% and 20%.

17. The gas spring of claim 16, wherein the quantity in weight of the mineral filler is about 9%.

18. The gas spring of claim 13, wherein the mineral filler of the second mixture comprises $BaSO_4$.

19. The gas spring of claim 13, wherein the quantity in weight of the powder of solid lubricant filler is between about 0.4% and 10%.

20. The gas spring of claim 19, wherein the quantity in weight of the powder of solid lubricant filler is about 4%.

21. The gas spring of claim 13, wherein the powder of solid lubricant filler of the second mixture comprises a PEEK, a PEKK, a PEKEKK, a PEK, a PEEKK, a PEEKEK, or a PEEEK.

* * * * *